Sept. 18, 1928.
C. T. SULLIVAN
1,684,561
CORN BINDER
Filed July 26, 1926
2 Sheets-Sheet 1
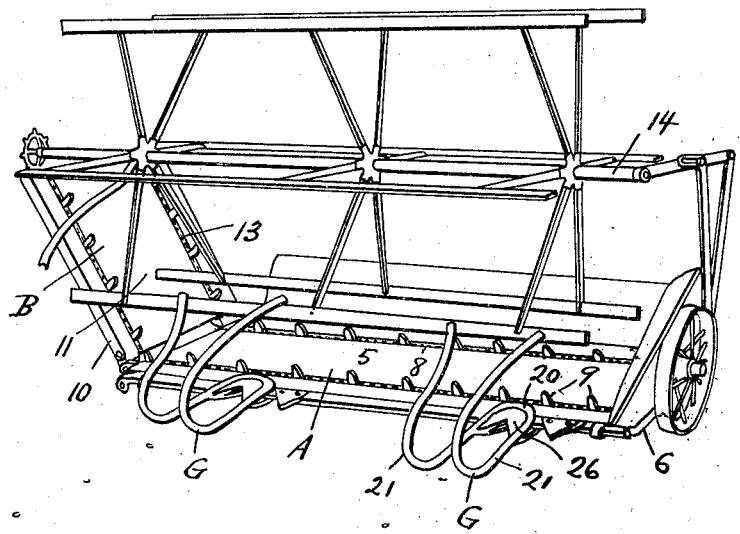
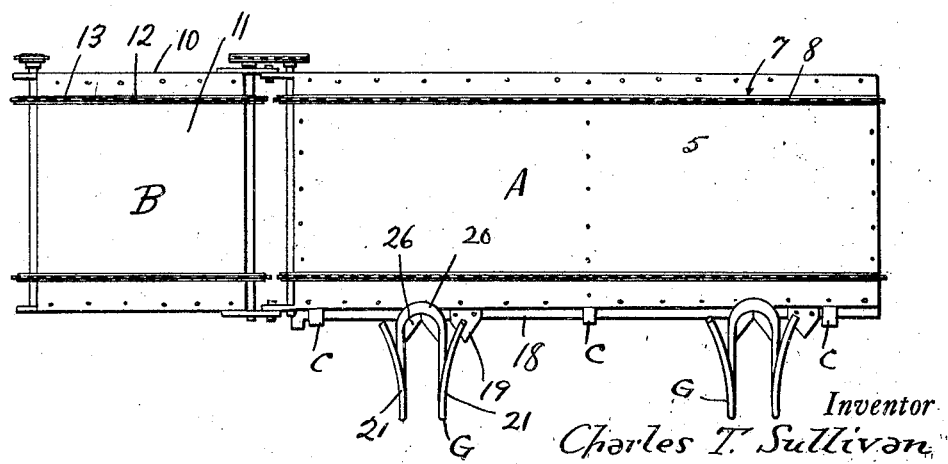
Inventor
Charles T. Sullivan
By Clarence A. O'Brien
Attorney Sept. 18, 1928.
C. T. SULLIVAN
CORN BINDER
Filed July 26, 1926
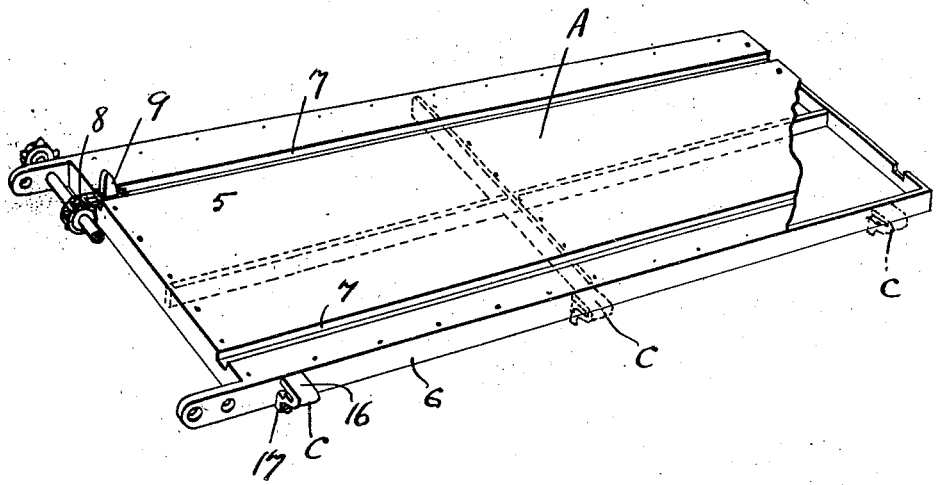
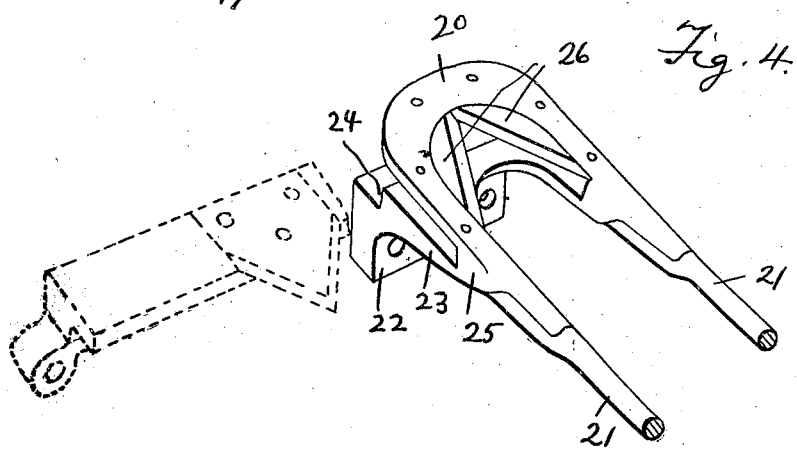
Inventor
Charles T. Sullivan
By Clarence A. O'Brien
Attorney Patented Sept. 18, 1928.

1,684,561

UNITED STATES PATENT OFFICE.

CHARLES T. SULLIVAN, OF CASSODAY, KANSAS.

CORN BINDER.

Application filed July 26, 1926. Serial No. 125,030.

The present invention relates to improvements in binders and particularly aims to provide attachments whereby it is possible to easily and cheaply transform the well known grain binders into corn binders, particularly adapted for harvesting and binding standing kaffir corn.

The structure is also useful in harvesting and binding any crops planted in rows. I contemplate the provision of a binder wherein the major portion of the structure is conventional, enabling certain features to be used whereby two rows of corn may be cut and bound.

Another very important object of the invention lies in the provision of an improvement of this nature which is exceedingly simple in its construction, strong and durable, inexpensive to manufacture, efficient and reliable in operation, easy to manipulate, easy to assemble and disassemble, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a perspective view of a binder embodying the features of my invention, Fig. 2 is a top plan view of the conveyor frame, Fig. 3 is a perspective view of the lower conveyor frame, and Fig. 4 is a fragmentary detail perspective showing of one of the guides.

Referring to the drawing in detail, it will be seen that A designates generally a horizontal conveyor and B an inclined elevator. Both the conveyor and the elevator are of the endless type, and instead of being constructed of an endless canvas belt as in an ordinary grain binder, I utilize a platform 5 in the conveyor A mounted in the frame structure 6 provided with longitudinally extending spaced channels 7. Endless conveyor chains 8 are trained in any suitable manner such as the endless belt used in the ordinary binder, and these chains are provided with suitable lugs 9. The chains extend so that the upper runs thereof move through the channels 7. The elevator B is practically of the same construction including the frame 10, the platform 11, provided with grooves 12 for receiving the endless chains 13.

These chains 8 and 13 may be operated in any suitable or preferred manner. The well known form of reel structure 14 is mounted above the horizontal conveyor frame in the usual well known manner.

Referring now more particularly to my improvements, it will be seen that I provide three brackets 15 on the forward edge of the frame. Each of these brackets includes a U-shaped body 16, one end of which is provided with an outwardly and laterally extending lug 18 that may be bolted to the edge of the conveyor frame. A cutter bar 18 is slidable through the brackets C and may be reciprocated in any suitable or preferred manner.

Two pairs of blades 19 are arranged and fixed to the cutter bar 18. The pairs are spaced from each other as is clearly shown in Fig. 2. A pair of guides G are associated with the forward edge of the conveyor frame. These guides are identical in construction, and each consists of a U-shaped body 20, the ends of which merge into arms 21 that are bent upwardly and rearwardly, the upwardly and rearwardly extending portions diverging rearwardly from each other for the purpose of receiving a row of corn therebetween.

A block 22 is provided with an extension 23 extending at right angles therefrom and positioned so as to form a shoulder 24. The plate 23 merges into the forward portion of the body 20 as is indicated at 25. The blocks 22 are secured in any suitable manner to the forward edge of the conveyor frame and the cutter bar 18 slides on top of the blocks 22 while the blades extend into the space provided between the extension 23 of the body 20. A pair of blades 26 is associated with each body 20 extending from the center of the bight portion thereof to points adjacent the ends of the legs thereof. The blades 26 of course, are associated with the blades 19 for cutting the standing corn.

The reel structure 14 will knock the standing corn over upon the conveyor A which will deliver it to the inclined elevator B to the binder mechanism in the usual well known manner.

It is thought that the construction, operation, and advantages of this invention will now be clear to those skilled in this art without a more detailed description thereof. I desire to point out that the platforms 5 and 11 have been provided in conjunction with the endless chains in place of the usual canvas conveyor because the corn is heavier. The usual type of endless conveyor, however, may be used with efficiency but not to the same high degree as is possible with the platform and endless chain structure described.

The main feature, however, of this invention, lies in the compact arrangement of the cutter bar with its blades in respect to the guides with their blade. The ease with which these parts may be assembled with the ordinary conventional construction also is the efficiency with which these parts cooperate to attain the end desired.

The present embodiment of the invention has been disclosed in detail merely by way of example, since in actual practice it attains the features of advantage enumerated as desirable in the statement of the invention and the above description.

Numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. In a binder structure; wherein the binder includes a horizontal conveyor frame among other elements; brackets fixed on the front edge of the frame, a cutter bar slidable through the brackets, two pairs of blades on the cutter bar, a pair of guides, each guide comprising a U-shaped body, a block, and extensions on the block forming a shoulder with the block, the end of the extension merging into the body adjacent its ends and disposed with its major portion spaced from the body, and arms extending from the ends of the body and curved upwardly and rearwardly, a pair of blades in each body, said cutter bar adapted to slide on top of the blocks when fixed to the forward edge of the frame, and the blades on the cutter bar adapted to move in the space provided between the extensions and the bodies.

2. In a binder structure; wherein the binder includes among other elements, a horizontal conveyor frame, brackets fixed on the front edge of the frame, a cutter bar slidable through the bracket, blades on the cutter bar, a guide comprising a U-shaped body, a block fixed to the conveyor frame and having an extension disposed at right angles thereto and forming a shoulder therewith, the end of the extension merging into the body adjacent its ends so that the major portion of the extension is spaced from the body, and arms extending from the ends of the body, blades in the body, said bars adapted to slide on top of the blocks so that its blades move in the space provided between the extensions and the body.

3. In a binder structure; wherein the binder includes among other elements, a horizontal conveyor frame; brackets fixed on the front edge of the frame, a cutter bar slidable through the bracket, blades on the cutter bar, a guide comprising a U-shaped body, a block fixed to the conveyor frame and having an extension disposed at right angles thereto and forming a shoulder therewith, the end of the extension merging into the body adjacent its ends so that the major portion of the extension is spaced from the body, arms extending from the ends of the body, blades in the body, said bars adapted to slide on top of the blocks so that its blades move in the space provided between the extensions and the body, said arms being curved upwardly and rearwardly and at their extremities diverging outwardly and rearwardly from each other.

4. In a binder structure; wherein the binder includes horizontal conveyor frame; brackets fixed on the front edge of the frame, a cutter bar slidable through the bracket, blades on the cutter bar, a guide comprising a U-shaped body, a block fixed to the frame and having a right angular extension forming a shoulder therewith, said extension merging into a body so that the major portion of the extension is in spaced relation to the body, and arms extending from the ends of the body, said bar adapted to slide on top of the blocks and having its blades extending into the space provided between the extensions and the body.

5. In a binder structure; wherein the binder includes horizontal conveyor frame; brackets fixed on the front side of the frame, a cutter bar slidable through the brackets, blades on the cutter bar, a guide comprising a U-shaped body, a block fixed to the frame and having a right angular extension forming a shoulder therewith, said extension merging into a body so that the major portion of the extension is in spaced relation to the body, and arms extending from the ends of the body, said bar adapted to slide on top of the blocks and having its blades extending into the space provided between the extensions and the body, and cooperating blades in the U-shaped body extending from the center of the bight portion thereof to points adjacent the ends of the legs thereof.

In testimony whereof I affix my signature.

CHARLES T. SULLIVAN.